(12) United States Patent
Purdy et al.

(10) Patent No.: US 8,507,042 B2
(45) Date of Patent: Aug. 13, 2013

(54) APPLICATION OF INSULATING COATING

(75) Inventors: Aaron T. Purdy, Marysville, WA (US);
Theresa N. Ward, Redmond, WA (US);
J. Sidney Clements, Boone, NC (US);
Michael G. Anderson, Renton, WA (US); Julie K. Bennett, Bellevue, WA (US); Kevin D. Pate, Kirkland, WA (US)

(73) Assignee: The Boeing Company, Chicago, IL (US)

( * ) Notice: Subject to any disclaimer, the term of this patent is extended or adjusted under 35 U.S.C. 154(b) by 0 days.

(21) Appl. No.: 13/355,887

(22) Filed: Jan. 23, 2012

(65) Prior Publication Data
US 2012/0119022 A1 May 17, 2012

Related U.S. Application Data

(63) Continuation of application No. 11/764,077, filed on Jun. 15, 2007, now Pat. No. 8,124,182.

(51) Int. Cl.
*B05D 5/00* (2006.01)

(52) U.S. Cl.
USPC ............ 427/287; 427/256; 427/261; 427/286; 244/119; 244/120; 244/121; 244/123.1; 244/134 D; 361/117

(58) Field of Classification Search
USPC ......... 427/256, 261, 265, 286, 287; 244/119, 244/120, 121, 123.1, 134 D; 361/117
See application file for complete search history.

(56) References Cited

U.S. PATENT DOCUMENTS

| 3,156,866 | A | 11/1964 | Anderson |
|---|---|---|---|
| 3,760,262 | A | 9/1973 | Chovanec et al. |
| 3,906,308 | A | 9/1975 | Amason et al. |
| 4,352,142 | A | 9/1982 | Olson |
| 4,583,702 | A | 4/1986 | Baldwin |
| 4,912,594 | A | 3/1990 | Bannink, Jr. |
| 7,186,280 | B2 | 3/2007 | Eom et al. |
| 2002/0172576 | A1 | 11/2002 | Keener |
| 2005/0103936 | A1 | 5/2005 | Pridham |
| 2005/0213278 | A1 | 9/2005 | Hawlley |
| 2006/0051592 | A1 | 3/2006 | Rawlings et al. |
| 2006/0146473 | A1 | 7/2006 | Heidlebaugh et al. |
| 2008/0144249 | A1 | 6/2008 | Rawlings |

OTHER PUBLICATIONS

PCT International Search Report, Jan. 28, 2013.

*Primary Examiner* — Nathan Empie
*Assistant Examiner* — Xiao Zhao
(74) *Attorney, Agent, or Firm* — Caven & Aghevli LLC

(57) ABSTRACT

Systems and methods for discontinuously applying an insulating primer to a carbon fiber reinforced plastic (CFRP) component are disclosed. In one embodiment, a method for mitigating electrical surface discharges from a CFRP component includes first applying an insulating primer to a metallic component. Next, an insulating primer is applied discontinuously to the CFRP component adjacent the metallic component. The discontinuous application of the insulating primer forms a primed portions and unprimed portions. The unprimed portions are configured to enable electrostatic dissipation.

15 Claims, 8 Drawing Sheets

APPLICATION OF INSULATING COATING

RELATED APPLICATIONS

This application is a continuation of U.S. patent application Ser. No. 11/764,077 now U.S. Pat. No 8,124,182 to Purdy, et al., filed Jun. 15, 2007, the disclosure of which is incorporated herein by reference in its entirety.

FIELD OF THE INVENTION

This invention relates to systems and methods for providing electrical insulation, and more specifically, to systems and methods for providing electrical insulation to prevent electrical surface discharges.

BACKGROUND OF THE INVENTION

The application of thin insulating coatings onto conductive materials is common in a variety of industries. In some instances, these insulating coatings may be purposefully applied to mitigate or prevent the corrosive degradation of the conductive materials. For example, insulating coatings may mitigate or prevent galvanic corrosion of metallic aircraft components by preventing charge mobility. In other instances, the insulating coatings may be applied to enhance the adhesion of subsequently applied coatings or materials, protect the substrate from harmful radiation exposure (e.g., ultraviolet emissions), act as a light reflective material, and retard microbial growth. Moreover, in additional instances, purely cosmetic coatings applied to conductive materials may also act as unintended insulating coatings. This is often due to the fact that cosmetic coatings rarely have electrostatic requirements.

The combination of insulating coating on electrically-grounded conductive materials, or substrates, may create capacitance as electrostatic charges accumulate on the coating surfaces. Capacitance may result in spontaneous, self-initiated electrical surface discharges when the electrostatic charges cannot relax to ground. These spontaneous, self-initiated electrical surface discharges are also commonly known as propagating brush discharges (PBD). Propagating brush discharges are generally undesirable. Cosmetic coatings may be made conductive to mitigate or eliminate such electrical surface discharges. However, conductive coatings cannot be substituted for insulating coatings that prevent galvanic corrosion. Therefore, novel systems and methods of insulating coating application that does not comprise the galvanic protection and other useful functions of the insulating coating, yet reduce or eliminate the possibility of electrical surface discharges, would have utility.

SUMMARY OF THE INVENTION

The present invention is directed to systems and methods for reducing or eliminating electrical surface discharges from insulating coatings without comprising the ability of insulating coating to prevent galvanic corrosion and provide other useful functions. As described above, these other useful functions may include enhancing the adhesion of subsequently applied coatings or materials, protecting the substrate from harmful radiation exposure (e.g., ultraviolet emissions), acting as a light reflective material, and retarding microbial growth. Embodiments of systems and methods in accordance with the present disclosure may advantageously reduce or eliminate electrical surface discharges, also known as propagating brush discharges, from non-conductive insulating covered conductive materials.

In one embodiment, a method for mitigating electrical surface discharges from a primer-covered carbon fiber reinforced plastic (CFRP) component includes first applying an insulating primer to a metallic component. Next, an insulating primer is applied discontinuously to a CFRP component adjacent the metallic component. The discontinuous application of the insulating primer forms a primed portions and unprimed portions. The unprimed portions are configured to enable electrostatic dissipation.

In another embodiment, a method for mitigating electrical surface discharges from a carbon fiber reinforced plastic (CFRP) component includes first applying an insulating primer to a metallic component. One or more electrostatically dissipative features are also applied to a CFRP component adjacent the metallic component. Moreover, an insulating primer is discontinuously applied to the CFRP component to form primed portions and unprimed portions. The primed portions are disposed adjacent to the electrostatically dissipative features. Overall, the discontinuously applied insulating primer is configured to prevent galvanic corrosion of the metallic component.

In an additional embodiment, an aircraft is disclosed. The aircraft includes a fuselage, a propulsion system operatively coupled to the fuselage. The aircraft also includes a metallic component disposed inside at least one of the fuselage and the wing, and a carbon fiber reinforced plastic (CFRP) component disposed adjacent the metallic component. The CFRP component includes a fuel containment surface. Moreover, an insulating primer is disposed discontinuously on the fuel containment surface to form primed portions and unprimed portions. The unprimed portions are configured to enable electrostatic dissipation.

The features, functions, and advantages that have been above or will be discussed below can be achieved independently in various embodiments, or may be combined in yet other embodiments, further details of which can be seen with reference to the following description and drawings.

BRIEF DESCRIPTION OF THE DRAWINGS

Embodiments of systems and methods in accordance with the teachings of the present disclosure are described in detail below with reference to the following drawings.

DETAILED DESCRIPTION

Embodiments of systems and methods in accordance with the present disclosure are directed to the discontinuous application of an insulating primer so that electrical surface discharges from carbon fiber reinforced plastic (CFRP) aircraft components are mitigated. At the same time, the discontinuous application of the insulating primer does not inhibiting the protection of adjacent metallic (e.g., aluminum) components from galvanic corrosion or disrupt the other useful functions provided by the insulating primer. Many specific details of certain embodiments of the invention are set forth in the following description and in FIGS. 1-8 to provide a thorough understanding of such embodiments. The present invention may have additional embodiments, or may be practiced without one or more of the details described below.

Figure 1:
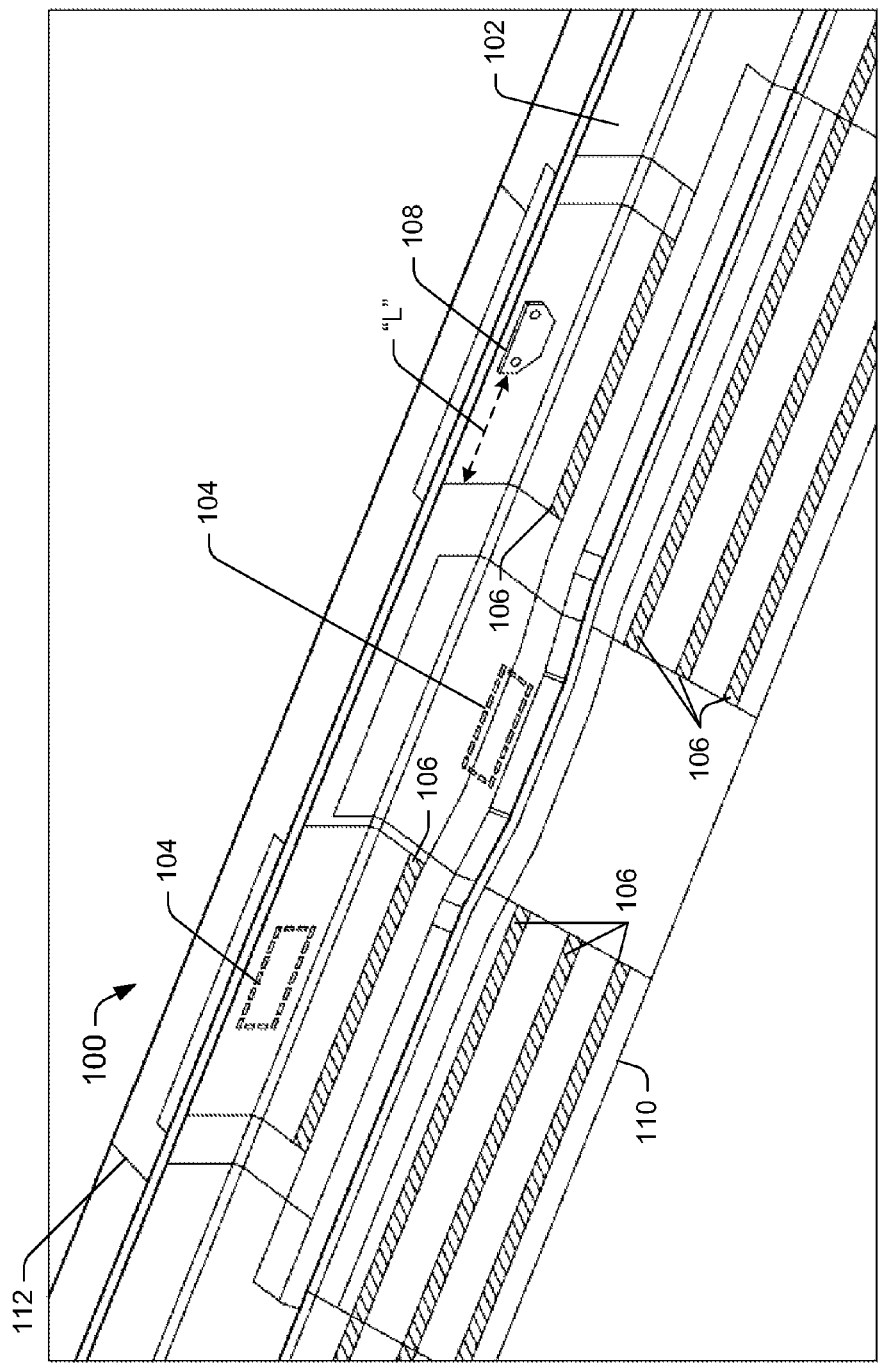
FIG. 1 is an isometric view of an exemplary carbon fiber reinforced plastic (CFRP) component. The exemplary CFRP component depicts a concept of applying insulating primer to prevent electrical surface discharges, in accordance with an embodiment of the invention

FIG. 1 is an isometric view of a sample carbon fiber reinforced plastic (CFRP) component 100. Sample CFRP component 100 illustrates an exemplary concept for applying insulating primer to provide galvanic corrosion protection while preventing electrical surface discharges. In accordance with various implementations, the CFRP component 100 may be manufactured from a CFRP designated as BMS 8-276 by the Boeing Company of Chicago, Ill.

The CFRP component 100 may include a surface area 102. The surface area 102 may include a plurality of attachment footprints 104. The attachment footprints 104 may be disposed such that they contact one or more metallic structural members (e.g., metallic brackets, metallic shear-ties, and the like). In this way, the attachment footprints 104 may enable the CFRP component 100 to be attached to one or more metallic components present in an aircraft. In one instance, the metallic structural members may include aluminum components. However, it will be appreciated that the metallic component attachment footprints 104 may enable the CFRP component 100 to be attached to components constructed from other types of conductive metal.

According to various implementations, an insulating primer may be applied to the surface area 102. The insulating primer is applied to prevent galvanic corrosion of metallic structural members attached to the CFRP component 100. In other instances, the insulating primer is also be applied to enhance the adhesion of subsequently applied coatings or materials, protect the substrate from harmful radiation exposure (e.g., ultraviolet emissions), act as a light reflective material, and retard microbial growth on the CFRP component 100.

However, as illustrated in FIG. 1, one or more unprimed areas 106 may be disposed in the insulating primer covering CFRP component 100. The unprimed areas 106 may enable the dissipation of electrons from the surface of the insulating primer into the CFRP component 100. In this way, the unprimed areas 106 may advantageously prevent the build up of electrostatic charges in the primer-covered CFRP component 100 that may initiate propagating brush discharges.

In various embodiments, a primer coating may be applied discontinuously to the surface of a CFRP component to form one or more unprimed areas. For example, Table I below lists a first set of exemplary actions for the discontinuous application of primer coatings to a metallic component and one or more adjacent CFRP component surfaces in accordance with an embodiment of the invention.

With reference to Table I, a method includes applying one or more coats of a corrosion resistant finish to the CFRP component at locations under and adjacent to one or more metallic (e.g., aluminum) components. In these embodiments, the corrosion resistant finish, or primer, may be a BMS 10-20, Type II, Class A, Grade A finish suitable for use on fuel tanks In some applications, a coat of this primer may also be applied for sealant adhesion. According to various embodiments, the corrosion resistant finish may be maintained at a maximum local thickness of up to 0.003 inches, or 3 mils ("mil" referring to one thousandth of an inch). In some embodiments, an edge of the primary boundary application area on the CFRP component may be maintained at a suitable minimum distance (e.g. approximately 1.75 inches) from nearby metallic components. Similarly, an unprimed stripe width may be maintained at a desired width (e.g. approximately 0.25 inches+/−0.020 inches).

As further shown in Table I, unprimed stripes are not required to be parallel. However, in various embodiments, each unprimed stripe may be maintained at no less than a maximum distance (e.g., approximately 2.2500 inches) and no more than a minimum distance (e.g., approximately 1.000 inch) from adjacent unprimed stripes. Moreover, unprimed stripes may continue into adjacent unprimed areas in several embodiments. In some embodiments, unprimed stripes may terminate after crossing another unprimed stripe. Additionally, the unprimed stripes may also terminate between two adjacent unprimed stripes that are less than a suitable distance from each other (e.g., approximately 2.25 inches). According to a number of embodiments, unprimed stripes may continue underneath fasteners and cap seal location as long as all other unprimed stripe parameters are met. In various embodiments, unprimed stripes are preferably not positioned on cut CFRP components, e.g., CFRP edges, so that corrosion protection will not be diminished. However, an exception may be made if the unprimed stripe direction is parallel to the shortest possible distance across the cut CFRP component edge. Finally, it will be appreciated that the distances discussed in the various embodiments above may be made along completed wetted structure surface. In other words, the measurements are taken with respect to an assembled structure that includes the carbon fiber and metallic components.

TABLE I

First Set of Exemplary Actions for Discontinuous Application

Apply two coats of BMS10-20, Type II, Class A, Grade A (Corrosion Resistance Finish for Integral Fuel Tanks) primer under and adjacent to metallic components for corrosion protection. Apply one coat of BMS10-20, Type II, Class A, Grade A primer as required locally for sealant adhesion. Maximum local thickness of BMS10-20 thickness may be 0.003 inches (3 mils).
The edge of the primer boundary application area on the carbon fiber reinforced plastic (CFRP) may be maintained at a minimum distance of 1.75 inches from metallic components.
An Unprimed stripe width may be 0.25 inches +/− 0.020 inches.
Unprimed stripes are not required to be parallel, but may be less than 2.2500 inches and more than 1.0000 inch from adjacent unprimed stripes.
Unprimed stripes may continue into adjacent unprimed areas. Unprimed stripes may terminate after crossing another unprimed stripe or may terminate between two adjacent unprimed stripes that are less than 2.25 inches from each other.
Unprimed stripes may continue underneath attached metallic or carbon fiber reinforced plastic (CFRP) components as long as all other unprimed stripe parameters are met.
Unprimed stripes may continue underneath fastener and cap seal locations as long as all other unprimed stripe requirements are met.
Unprimed stripes are preferably not positioned on cut CFRP component TABLE I-continued First Set of Exemplary Actions for Discontinuous Application edges for corrosion protection reasons, except if the unprimed stripe direction is parallel to the shortest possible distance across the cut CFRP component edge.
All distance measurements may be made along completed wetted structure surface.

Likewise, Table II below lists a second set of exemplary actions of the discontinuous application of primer coatings to a metallic component and one or more adjacent carbon fiber reinforced plastic (CFRP) component surfaces. With reference to Table II, in some embodiments, a method includes applying one or more coats of a corrosion resistant finish to the CFRP component at locations under and adjacent to one or more metallic (e.g., aluminum) components. In some embodiments, the corrosion resistant finish, or primer, may be a BMS10-20, Type II, Class A, Grade A finish suitable for use on fuel tanks. In some applications, a coat of a primer may be applied for sealant adhesion. According to various embodiments, the corrosion resistant finish may be maintained at a maximum local thickness of up to approximately 0.003 inches (3 mils).

In some embodiments, a surface of the CFRP component may be configured with one or more suitable electrostatically dissipative features. Suitable dissipative features may include (1) metallic components primed with BMS 10-20, (2) k-code or bare fastener hardware (washer, head or collar/nut) with or without a cap seal, or (3) suitably configured bare CFRP component surfaces (e.g., a primer stripe of approximately 2.25 inches maximum width with a minimum of approximately 0.25 inch bare CFRP on either side). As further described below, k-code may indicate that the fastener is coated with a phenolic coating or a pigment coating. In such embodiments, the maximum width of the primer covering the surface of the CFRP component may be no more than approximately 2.25 inches from the electrostatically dissipative feature.

The minimum width of primer coverage applied for corrosion protection may extend at least a minimum distance (e.g., approximately 1.75 inches) away from the one or more metallic components. According to additional embodiments, minimum width of primer coverage applied for sealant application may be what is needed to ensure sealant is applied only to primed surfaces after all part tolerances, assembly tolerances and sealant application tolerances are considered. In one embodiment, sealant application areas include fillet seals, brush seals, cap seals and fay seals.

In a number of embodiments, the allowed length of primer coverage may be unlimited as long as (1) the maximum width parameter (e.g., approximately 2.25 inches) away from dissipative materials is met, (2) the minimum width parameter (e.g., approximately 1.75 inches) away from a metallic component is met, and (3) the sealant is applied to primed surfaces after all tolerances have been considered. Thus, primer may be applied to the CFRP component surface according to these parameters. In additional embodiments, adjacent areas of primer may be separated by a minimum width unprimed CFRP (e.g., approximately 0.25 inch). In accordance with this consideration, primer may be selectively applied to the CFRP component. Further, in several embodiments, if the minimum dimension (e.g. approximately 1.75 inches) away from a metallic component cannot be met without resulting in overlapping primed areas greater than a maximum distance (e.g., approximately 2.25 inches) away from a dissipative material, primer coating coverage area may be reduced to a new minimum distance (e.g., approximately 1.0 inch) from a metallic component. Finally, it will be appreciated that the distances discussed in the various embodiments above may be made along completed wetted structure surface. In other words, the measurements are taken with respect to an assembled structure that includes the carbon fiber and metallic components.

TABLE II

Second Set of Exemplary Actions for Discontinuous Application

Apply two coats of BMS10-20, Type II, Class A, Grade A (Corrosion Resistance Finish for Integral Fuel Tanks) under and adjacent to metallic components for corrosion protection. Apply one coat of BMS10-20, Type II, Class A, Grade A as required locally for sealant adhesion. Maximum local thickness of BMS10-20 thickness may be 0.003 inches (3 mils).
Maximum width of carbon fiber reinforced plastic (CFRP) surfaces covered with primer may be no more than 2.25 inches away from an electrostatically dissipative feature. Suitable dissipative feature may include (1) metallic components primed with BMS10-20, (2) k-code or bare fastener hardware (washer, head or collar/nut) with or without a cap seal, or (3) bare CFRP (e.g., a primer stripe of 2.25 inches maximum width with minimum 0.25 inch bare CFRP on either side).
Minimum width of primer coverage applied for corrosion protection may be at least 1.75 inches away from a metallic component.
Minimum width of primer coverage applied for sealant application may be what is needed to ensure sealant is applied only to primed surfaces after all part, assembly and sealant application tolerances are considered. Sealant application areas include fillet seals, brush seals, cap seals and fay seals.
Allowed length of primer coverage may be unlimited as long as (1) the maximum width parameter of 2.25 inches away from dissipative materials is met, (2) the minimum width parameter of 1.75 inches away from a metallic component is met, and (3) the sealant is applied to primed surfaces after all tolerances have been considered.
Adjacent areas of primer may be separated by 0.25 inch of minimum unprimed CFRP.
If the 1.75 inches minimum dimension away from a metallic component cannot be met without resulting in overlapping primed areas greater than 2.25 inches away from a dissipative material, primer coating coverage area may be reduced to 1.0 inch minimum distance from the metallic component.
All distance measurements may be made along completed wetted structure surface.

It will be appreciated that Tables I and II are exemplary sets of actions for the discontinuous application of primer coatings to metallic components and one or more adjacent carbon fiber reinforced plastic (CFRP) component surfaces. Accordingly, it will be appreciated that in additional embodiments, alternative actions for the discontinuous application of primer coatings may also achieve galvanic corrosion protection while simultaneously preventing electrostatic buildup.

FIGS. 2-5 illustrate exemplary processes for discontinuously applying insulating primers to achieve unprimed areas, such as unprimed areas 106 described above. The processes may incorporate one or more exemplary rules outlined in Table I and II. The order in which the operations are described in each process is not intended to be construed as a limitation, and any number of the described blocks can be combined in any order and/or in parallel to implement the process.

Figure 2:
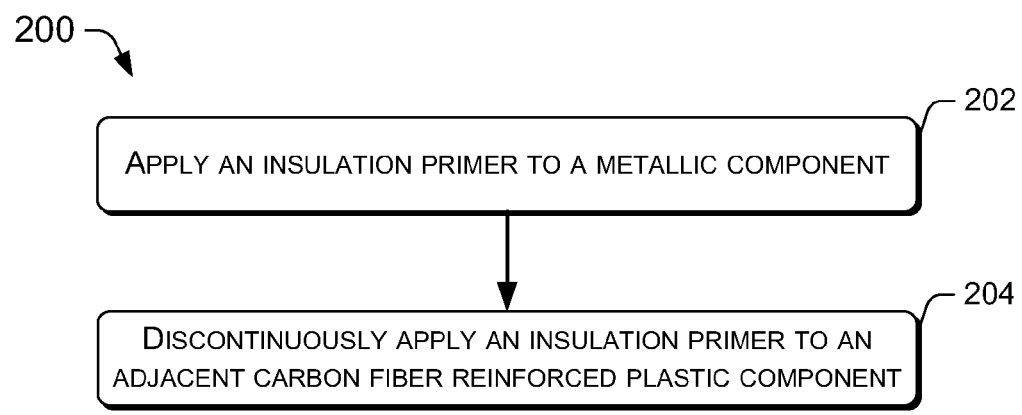
FIG. 2 is a flow diagram illustrating an exemplary process for providing insulating primer to metallic and CFRP components in accordance with an embodiment.

FIG. 2 is a flow diagram illustrating an exemplary process for applying insulating primer to metallic and CFRP components. At block 202, an insulating primer may be applied to a metallic component for corrosion protection. For example, the insulating primer may be applied to an aluminum aircraft structural component. At block 204, the insulating primer may be discontinuously applied to an adjacent CFRP component, such as CFRP component 100 (FIG. 1). Additional details regarding the discontinuous application of the insulating primer is described below with respect to FIG. 3.

Moreover, according to various embodiments, the application of insulating primer may include the application of a plurality of coats of a corrosion resistance finish for integral fuel tanks, as referenced by the designation of "BMS 10-20" by the Boeing Company of Chicago, Ill. In one particular embodiment, the maximum thickness of the "BMS 10-20" may be up to 0.003 inches (3 mils).

Figure 3:
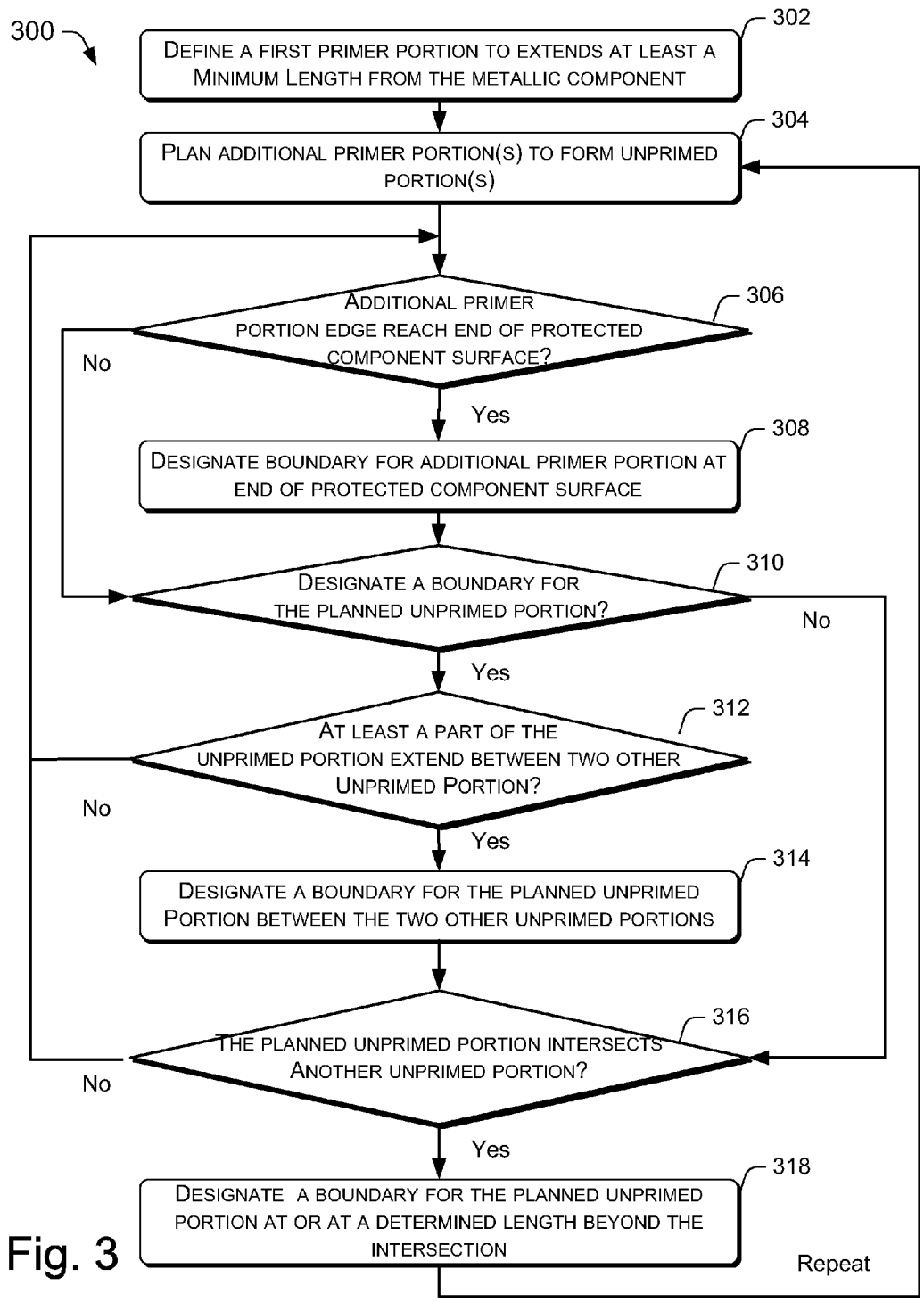
FIG. 3 is a flow diagram illustrating an exemplary process for defining the discontinuous application of an insulating primer to a CFRP component in accordance with an embodiment.

FIG. 3 is a flow diagram illustrating an exemplary process for defining the discontinuous application of an insulating primer to a carbon fiber reinforced plastic (CFRP) component. FIG. 3 illustrates a process that facilitates block 204 of exemplary process 200. In other words, once discontinuous areas of insulating primer are planned, the insulating primer may be applied to the CFRP component.

At block 302, a first primer portion may be planned for a CFRP component so that the primer extends at least a minimum length from the adjacent metallic component in all directions. For example, as shown in FIG. 1, if a metallic bracket 108 is attached to an attachment footprint (not shown), then the primer portion may be designated so that its coverage of the fiber-carbon component 100 extends at least the minimum length "L" from the edges of metallic bracket 108. In one implementation, the minimum length "L" may include a length of approximately 1.75 inches. Accordingly, the planned primer of minimum length "L" may protect the adjacent metallic component 108 (which is in contact with the CFRP component 100) from galvanic corrosion. In some implementations, the first portion of the primer may be designated to end where the minimum length "L" is reached. This designated termination may ensure that when the primer is applied, the primer is applied in such a way that at least some unprimed portions are present on the CFRP component.

At block 304, an additional primer portion may be planned on the CFRP component 100. The additional primer may be planned so that an unprimed portion is formed. The unprimed portion is an area on the CFRP component where no primer will be applied. In one implementation, the unprimed portion may be created by placing a masking material adjacent the first primer portion, then applying the additional primer portion. The masking material, which may be removed after the application of the additional primer portion, thus may ensure the formation of the unprimed portion. As shown in FIG. 1, in one embodiment, the unprimed portion, such as unprimed portion 106, may be formed so that it has a width of approximately 0.125 inches+/−0.020 inches. As describe above, the unprimed portion may serve to prevent electrical surface discharges by enabling the harmless dissipation of electrostatic buildup into the CFRP component 100.

At decision block 306, a determination is made as to whether the planned additional primer portion has reached the end of the protected component surface. As shown in FIG. 1, in one implementation, the end of the protected component surface may include an edge 110 of the CFRP component 100. In another implementation, the end of the protected component surface may be the end 112 of an area on the CFRP component where the primer is necessary. If the planned additional primer portion reaches the end of the protected component surface ("yes" at decision block 306), then a boundary for the additional primer portion may be defined at block 308. Specifically, the boundary for the primer portion extension may be defined to correspond to the end of the protected component surface. In other words, during the application of primer, the primer may be stopped at this boundary on the component surface.

However, if the planned additional primer portion does not extend to the end of the protected component surface ("no" at decision block 306), then the process 300 may continue to decision block 310 where another determination is made. In some embodiments, no end of protected surface may be present on the CFRP component as all the surface of the component may necessitate protection by the insulating primer.

At decision block 310, a determination may be made as to whether at least one boundary for an unprimed portion should be defined. In some implementations, the at least one boundary for the unprimed portion may be defined by designating locations where the planned additional primer portion should be applied to cover surface areas proximate the unprimed portion. In other implementations, the boundary of the unprimed portion may be defined by designating where another primer portion should be applied. The determination of one or more unprimed portion boundaries may ensure that most of the surfaces of the CFRP component are protected. For example, as described above, the boundaries of an unprimed portion may be defined to ensure that the width of the unprimed portion does not exceed 0.25 inches+/−0.020 inches at any point along its length.

If it is determined at decision block 310 that a boundary for the unprimed portion should be defined, ("yes" at decision block 310), an additional determination is required at decision block 312. However, if it is determined that a boundary for the unprimed portion should not be defined ("no" at decision block 310), the process 300 may proceed to decision block 316.

Returning to decision block 312, a determination may be made as to whether at least a part of the defined unprimed portion extends between two other defined unprimed portions. If the unprimed portion does not extend between the two other defined unprimed portions ("no" at decision block 312), the process 300 may return to block 306 where the additional primer portion may be further designated to define the unprimed portion.

However, if the defined unprimed portion does extend between two other defined unprimed portions ("yes" at decision block 312), the defined unprimed portion may be designated to terminate between two other unprimed portions at block 314. One embodiment of the designated termination for the defined unprimed portion is shown in FIG. 6.

Figure 6:
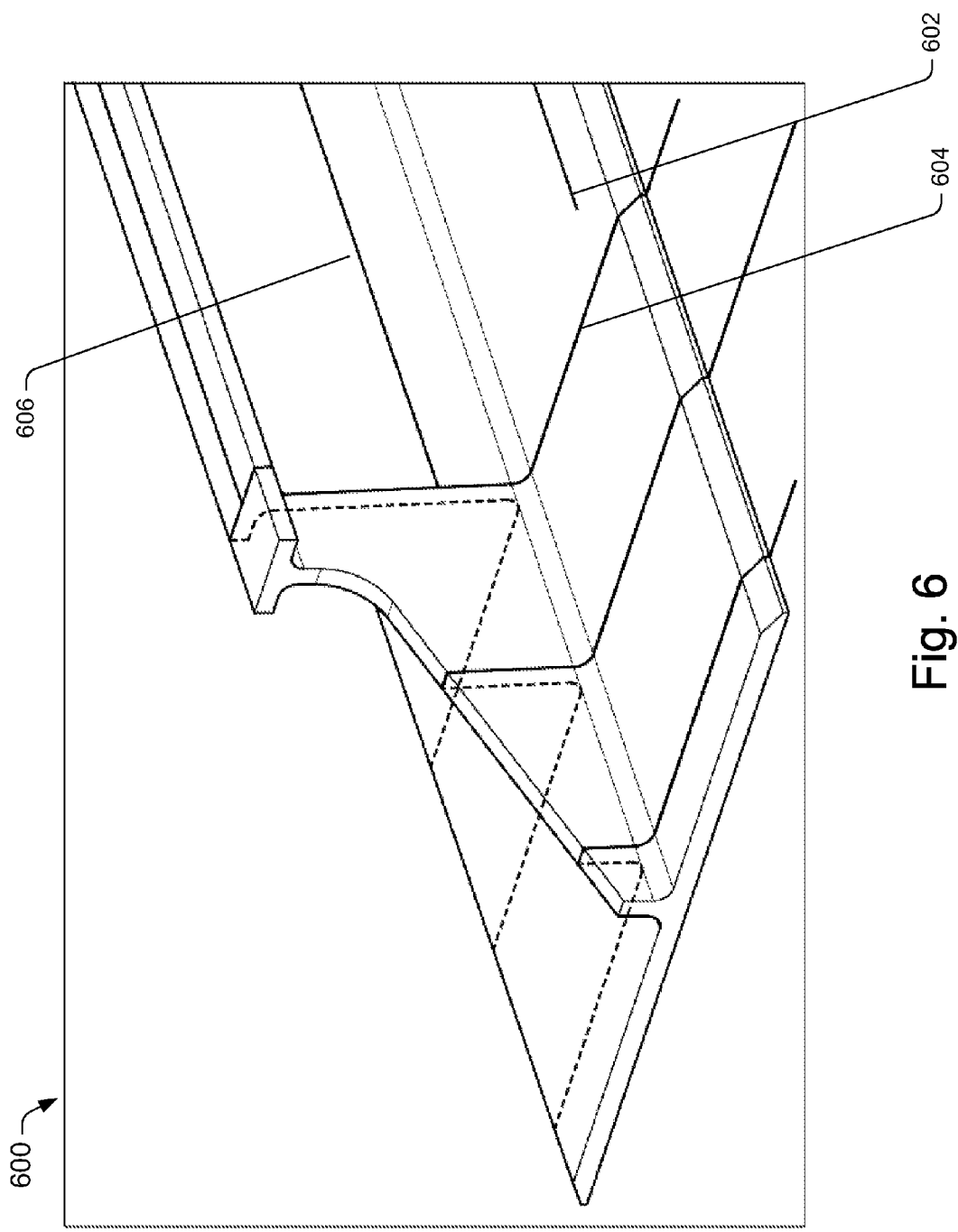
FIGS. 6-7 are isometric and side elevation views of a CFRP component.

FIG. 6 illustrates an end of carbon fiber reinforced plastic (CFRP) component 600. As shown in FIG. 6, the CFRP component 600 includes defined unprimed portions 602-606. Each of the defined unprimed portions includes a pair of longitudinal sides. Further, the defined unprimed portion 602 is designated to end between defined unprimed portions 604 and 606. The designation of an unprimed portion for termination between other primed portions may ensure that unprimed portions are defined sufficiently proximate to one another so that no area of the CFRP component surface is at risk of building up electrostatic charge. As described above, this designated termination of the unprimed portion may be dictated by the exemplary actions described in Table I.

Returning to FIG. 3, a further determination may be made as to whether the defined unprimed portion intersects another defined unprimed portion at decision block 316. If the defined unprimed portion does not intersect another unprimed portion, ("no" at decision block 316), the process 300 may return to block 306 where the additional primer may be designated to define the unprimed portion. However, if the defined unprimed portion intersects another defined unprimed portion, ("yes" at decision block 316), the defined unprimed portion may be designated to terminate at or at a pre-determined length beyond the intersection at block 318. For example, in some embodiments that conform to the rules described in Table I, the defined unprimed portion may be designated to continue for no more than approximately 1.0000 inch after its intersection with another defined unprimed portion.

After the designated termination of the defined unprimed portion at decision block 318, the process 300 may loop back to block 304, where another additional primer portion may be defined. Indeed, the process 300 may be looped as many times as needed to completely cover a CFRP component with planned primer portions and designated unprimed portions. In some embodiments, in conformance to the exemplary rules in Table I, the one or more primer portions may be planned to designate unprimed portions such that the designated unprimed portions are stripes. Moreover, the longitudinal sides of the designated unprimed stripes are such that any point on a first side of a first stripe is less than approximately 2.2500 inches and more than approximately 1.0000 inch from any point on a second side of an adjacent second stripe. To put it another way, the primer portion may be planned such that they form stripes that are between approximately 1.0000 inch and approximately 2.2500 inches, inclusive. In one implementation, the stripes may include substantially parallel longitudinal sides. However, the stripes may include longitudinal sides that are not substantially parallel. In this way, sufficient number of unprimed portion may be designated to prevent electrostatic buildup.

Figure 4:
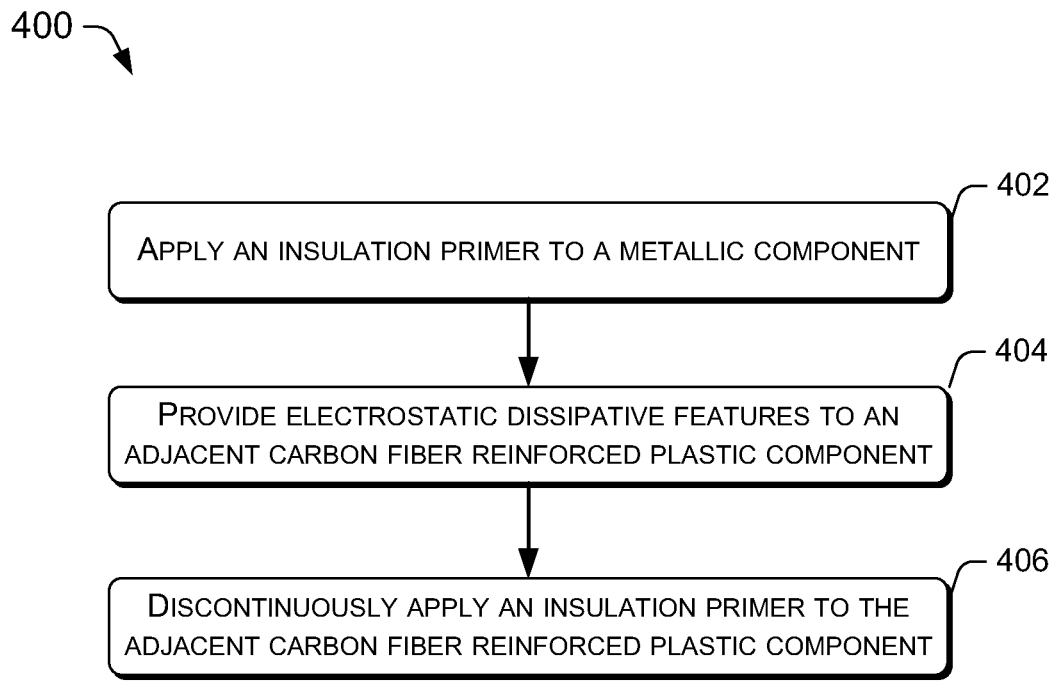
FIG. 4 is a flow diagram illustrating an exemplary process for providing insulating primer to metallic components and CFRP components that include electrostatic dissipative features, in accordance with an embodiment.

FIG. 4 is a flow diagram illustrating an exemplary process for providing insulating primer to metallic components and carbon fiber reinforced plastic (CFRP) components that include electrostatic dissipative features. At block 402, an insulating primer may be applied to a metallic component for corrosion protection. For example, the insulating primer may be applied to an aluminum aircraft structural component.

At block 404, one or more electrostatic dissipative features may be provided to an adjacent CFRP component, such as CFRP component 100 (FIG. 1). In one instance, the dissipative features may include metallic components covered with an insulating primer. In another instance, the dissipative features may include "k-code" or bare fastener hardware (e.g., washers, heads, collar and nut combinations, and the like). Moreover, "k-code" fastener hardware may include fastener hardware that are covered with phenolic coatings or pigment coatings. The phenolic coatings are typically non-conductive as they provide weak dielectric isolation. However, when these phenolic coatings experience low voltages, they may breakdown and permit a charge to flow to ground. In this way, the "k-code" fastener hardware may serve as "static dissipative features" in some instances. In other instances, bare CFRP may service as electrostatic dissipative features. In one particular instance, the bare CFRP may in the form of unprimed stripes, that is, areas on the surface of the CFRP component 100 that are not covered with a primer. The unprimed stripes may include substantially parallel longitudinal sides.

At block 406, the insulating primer may be discontinuously applied to an adjacent CFRP component, such as CFRP component 100. Additional details regarding the discontinuous application of the insulating primer is described below with respect to FIG. 5.

Moreover, according to various embodiments, the application of insulating primer may include the application of a plurality of coats of a corrosion resistance finish for integral fuel tanks, as referenced by the designation of "BMS 10-20" by the Boeing Company of Chicago, Ill. In one particular embodiment, the maximum thickness of the "BMS 10-20" may be up to 0.003 inches (3 mils).

Figure 5:
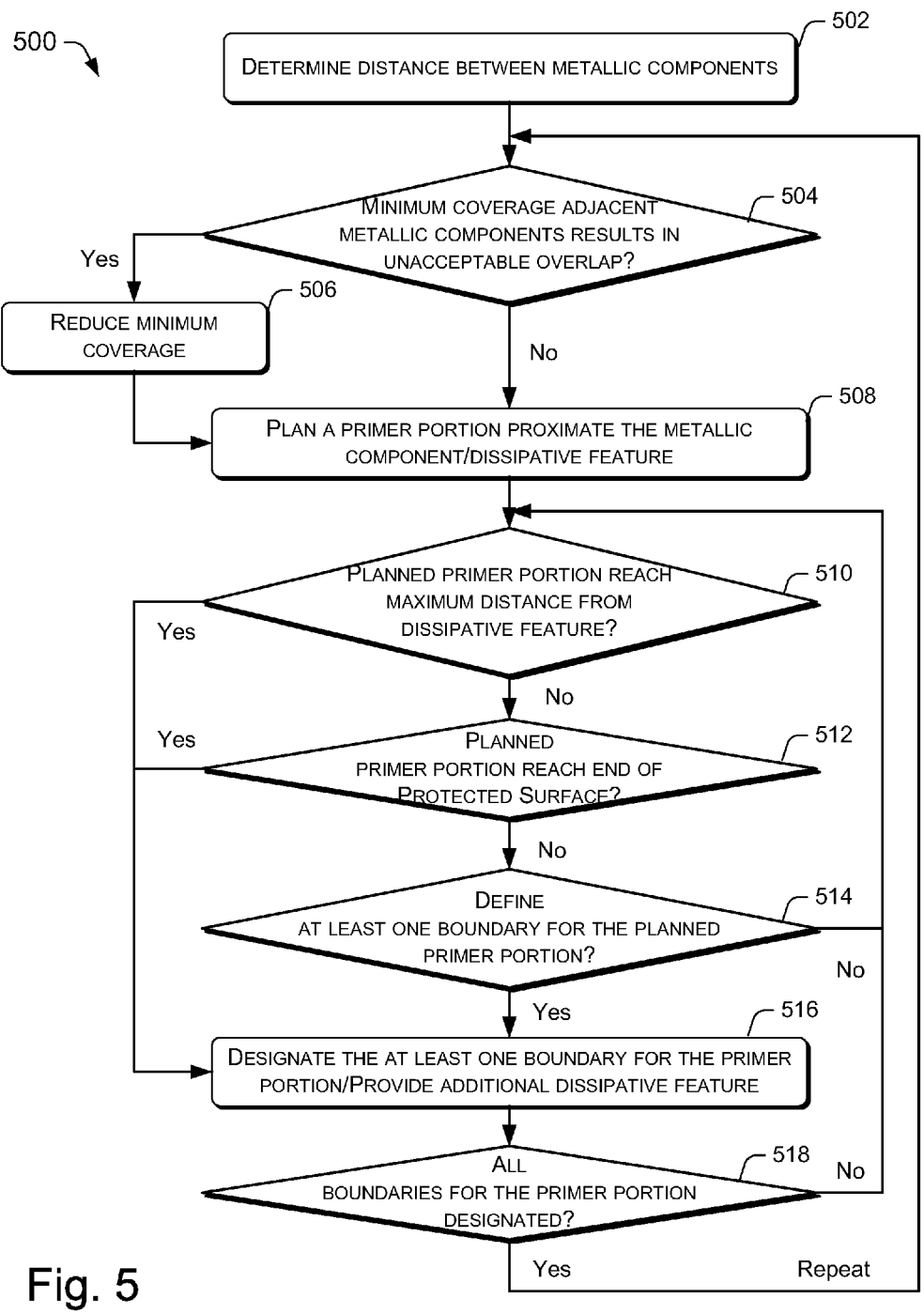
FIG. 5 is a flow diagram illustrating an exemplary process for defining the discontinuous application of an insulating primer to a CFRP component that includes dissipative features, in accordance with an embodiment.

FIG. 5 is a flow diagram illustrating an exemplary process for defining the discontinuous application of an insulating primer to a carbon fiber reinforced plastic (CFRP) component 100 that includes dissipative features. FIG. 5 illustrates a process that facilitates block 406 of exemplary process 400. In other words, once discontinuous areas of insulating primer are planned, the insulating primer may be applied to the CFRP component.

At block 502, the shortest distance between a plurality of metallic components adjacent a CFRP component may be determined. At block 504, the shortest distance between the plurality of metallic components is compared to the minimum coverage requirement for each bracket. According to various implementations, the minimum coverage requirement is the minimum length that the applied primer extends from the edge of an aluminum bracket, so that the bracket is protected from galvanic corrosion. In some implementations, the minimum length may be a length of approximately 1.75 inches.

Figure 7:
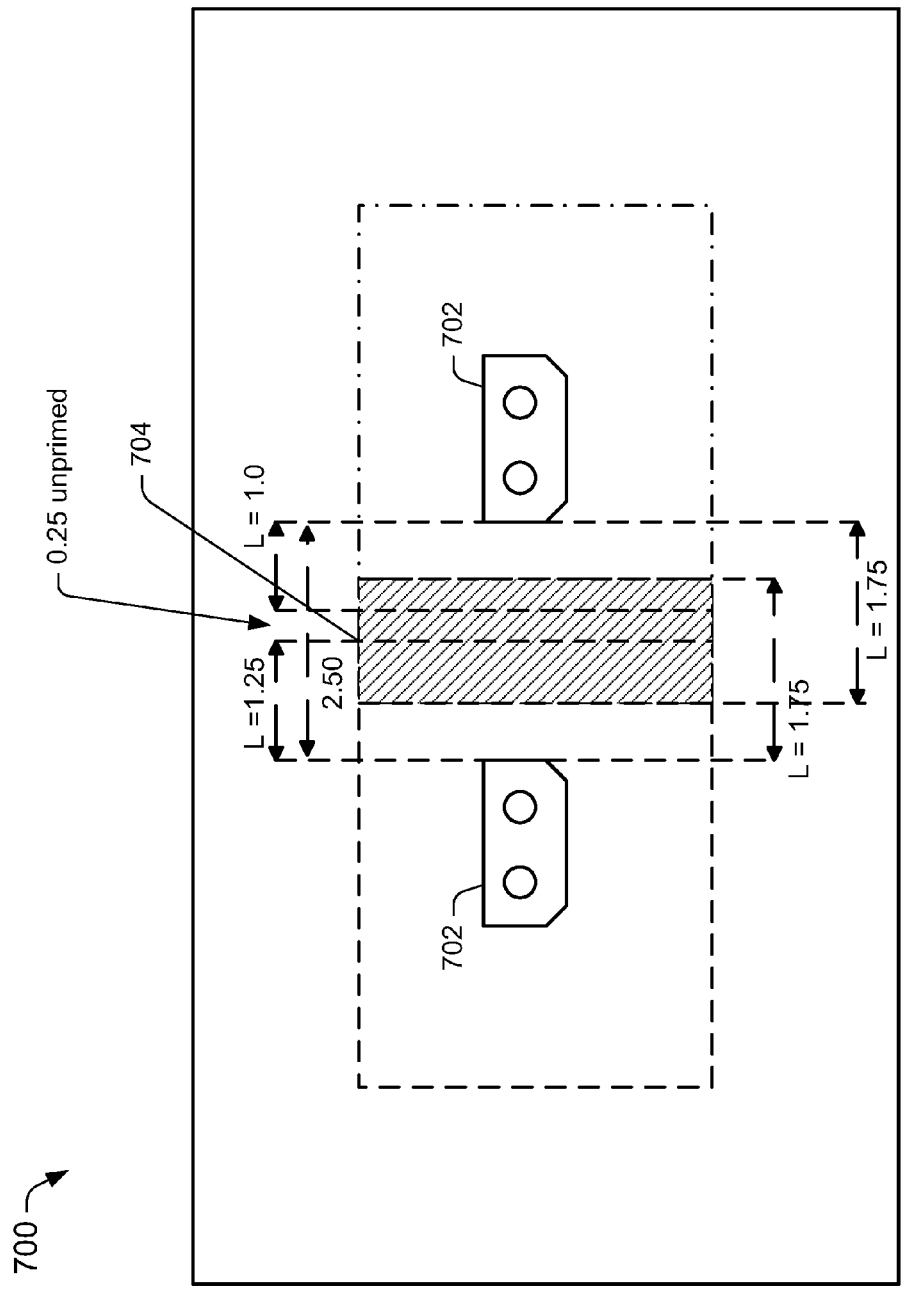

If the shortest distance between the plurality of metallic components is such that the coverage areas extending from a plurality of metallic components results in unacceptable overlap, then the minimum length "L", and in turn, the minimum primer coverage, may be reduced in the affected region. For example, as shown in FIG. 7, there may be two aluminum brackets 702 mounted with their closest edges 2.50 inches apart. This embodiment may conform to the exemplary actions in Table II, so that minimum length "L" is ideally configured to extend 1.75 inches from the edges of the each aluminum brackets. This may create an instance where the entire 2.50 inch distance between the two aluminum brackets will be covered with a primer (because 1.75 inches×2 exceeds 2.50 inches). However, as described above, the exemplary actions in Table II may also require that the maximum width of a primer covering a CFRP surface to be no more than approximately 2.25 inches away from an electrostatic dissipative feature, (such as a aluminum bracket). In other words, the coverage width of 2.50 inches between the aluminum brackets is an unacceptable overlap 704 as it does not conform to the 2.25 inch maximum length rule.

Accordingly, if the minimum coverage adjacent the plurality of metallic components results in unacceptable overlap ("yes" at the decision block 404), the minimum coverage requirement for each of the metallic components may be reduced to plan for an electrostatically dissipative unprimed portion. Returning to the embodiment of the two aluminum brackets 702 mounted 2.50 inches apart on a CFRP component in FIG. 7, the minimum length "L" may be reduced to no less than approximately 1.0 inches from the metallic component (e.g. in conformance with the exemplary actions in Table II). In one implementation, the minimum length "L" for a first aluminum bracket may be reduced to approximately 1.25 inches. This reduction may be paired with a reduction of the minimum length "L" for a second aluminum bracket to approximately 1.0 inch to create an unprimed portion of approximately 0.25 inch in width as an electrostatic dissipative feature. The 0.25 inch unprimed portion may conform to the exemplary actions in Table II. It will be appreciated that other reduction combinations, (e.g., 1.20 inches and 1.05 inches, 1.15 inches and 1.10 inches), may be used between two metallic components, such as aluminum brackets, as along as a necessary electrostatic dissipative feature is created. This may include, when feasible, reducing the minimum length "L" for one of a plurality of metallic components, rather than reducing the minimum coverage of both. After the reduction in minimum coverage, the process 500 may proceed to block 508.

However, if the minimum coverage adjacent the plurality of metallic components does not result in unacceptable overlap ("no" at the decision block 404), the process 500 may proceed directly to block 508.

At block 508, a primer portion may be planned proximate a metallic component. In one implementation, the planned primer portion generally extends a minimum length "L" of approximately 1.75 inches from the edges of the metallic component to prevent galvanic corrosion. However, as described above, the defined coverage of the primer portion may be reduced if unacceptable overlap with adjacent primer coverage may result.

At decision block 510, a determination may be made as to whether the planned primer portion has extended a maximum distance from a dissipative component (e.g., metallic component, k-code or bare fastener hardware, bare CFRP). In one implementation, the planned primer portion must extend no more than approximately 2.25 inches from the dissipative feature. This may ensure that adequate dissipative features are provided to prevent electrostatic charge buildup. If the defined primer portion has extended to a maximum distance from the dissipative feature, ("yes" at decision block 510), the process 500 may proceed to block 516. At block 516, the defined primer portion may be designated to end at a boundary beyond which further application of the primer may cause to the primer to exceed the approximately 2.25 inch limit described above. In one embodiment, the termination of planned primer portion application may be achieved by designating the provision of a dissipative feature. The designated dissipative feature may be an unprimed portion of approximately 0.25 inch in width. In other implementations, the designated dissipative feature may include metallic components or bare fasteners describe above. During primer application, the unprimed portion may be provided by masking the surface of the CFRP component from primer application.

At decision block 512, a determination may be made as to whether the planned primer portion has extended to an end of the protected component surface. In one implementation, the end of protected component surface may correspond to an edge of the CFRP component. In another implementation, the end of the protected component surface may be the end of an area on the CFRP component where the primer is necessary. If the defined primer portion has extended to the end of the protected component surface ("yes" at decision block 512), then a boundary may be designated for the planned primer portion at the end of the protected component surface at block 516.

However, if the defined primer portion did not reach the end of the protected component surface, ("no" at decision block 512), then the process 500 may continue to decision block 514, where another determination is made.

At decision block 514, a determination may be made as to whether at least one more boundary should be designated for the defined primer portion. The designation of at least one more boundary for the defined primer portion may serve to ensure that most of the surfaces of the CFRP component that need primer protection are indeed covered. In some implementations, one or more boundaries may be designated so that a planned primer portion applied proximate a metallic component would have sufficient minimum coverage as described above. Accordingly, if a determination is made at least one boundary should be designated, ("yes" at decision block 514), the process 500 will proceed to block 516.

However, if a determination is made that no additional boundary should be designated for the planned primer portion, ("no" at decision block 514), the process will loop back to step 410, where the determinations in decision blocks 510-514 may be continuously made until at least one boundary is designated at block 516 and the process 500 proceeds to block 518.

At decision block 518, a determination may be made as to whether all the boundaries of the planned primer portion are designated. The designation of every boundary for the defined primer portion may indicate that the definition of the primer portion is complete. If all the boundaries of the defined primer portion have not been designated ("no" at decision block 518), then the process 500 may loop back to block 510 until all the boundaries for the planned primer portion are designated.

However, if all the boundaries of primer portion being defined are designated, ("yes" at decision block 518), the process 500 may loop back to block 504 so that more primer portions may be planned so that they are proximate to additional dissipative features. In this way, during insulating primer application, primer may be applied to a CFRP component to form unprimed portions that advantageously offer protection from galvanic corrosion as well as protection from electrical surface discharges.

Figure 8:
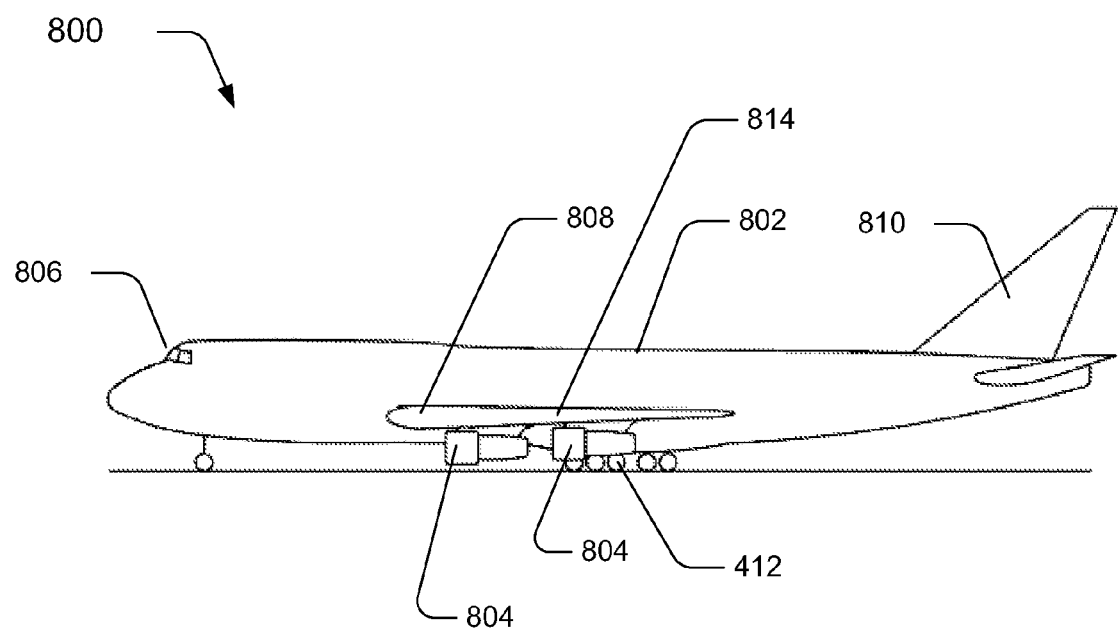
FIG. 8 is a side elevational view of an aircraft equipped with at least one CFRP component prepared with an insulating primer in accordance with the processes in FIGS. 2-5.

FIG. 8 is a side elevational view of an aircraft 800 in accordance with an embodiment of the present invention. In general, except for one or more components in accordance with the present invention, the various components and subsystems of the aircraft 400 may be of known construction and, for the sake of brevity, will not be described in detail herein. As shown in FIG. 8, the aircraft 800 includes one or more propulsion units 804 coupled to a fuselage 802, a cockpit 806 in the fuselage 802, wing assemblies 808 (or other lifting surfaces), a tail assembly 810, a landing assembly 812, a control system (not visible), and a host of other systems and subsystems that enable proper operation of the aircraft 800. At least one carbon fiber reinforced plastic (CFRP) component 814 coated with a discontinuous layer of primer in accordance with various embodiments is located within at least one of the fuselage 402 and wing assemblies 808 of the aircraft 800.

Although the aircraft 800 shown in FIG. 8 is generally representative of a commercial passenger aircraft, including, for example, the 737, 747, 757, 767, 777, and 787 models commercially-available from The Boeing Company of Chicago, Ill., the inventive apparatus and methods disclosed herein may also be employed in the assembly of virtually any other types of aircraft. More specifically, the teachings of the present invention may be applied to the manufacture and assembly of other passenger aircraft, cargo aircraft, rotary aircraft, and any other types of aircraft, including those described, for example, in *The Illustrated Encyclopedia of Military Aircraft* by Enzo Angelucci, published by Book Sales Publishers, September 2001, and in *Jane's All the World's Aircraft* published by Jane's Information Group of Coulsdon, Surrey, United Kingdom, which texts are incorporated herein by reference. It may also be appreciated that alternate embodiments of system and methods in accordance with the present invention may be utilized in other aerial vehicles.

Embodiments of systems and methods in accordance with the present disclosure may provide significant advantages over the prior art. The discontinuous application of insulating primer on a carbon fiber reinforced plastic (CFRP) component that is adjacent to a metallic component may simultaneously mitigate galvanic corrosion and reduce the possibility of electrostatic buildup by enabling static charges to escape to ground. Accordingly, electrostatic buildup and undesirable electrical surface discharges may be reduced or eliminated.

While embodiments of the invention have been illustrated and described above, many changes can be made without departing from the spirit and scope of the invention. For instance, the various dimensions and widths described in Table I and Table II may be suitably adjusted for different forms of carbon fiber reinforced plastic (CFRP), different types of insulating primers, or different electrostatic dissipative features. Accordingly, the scope of the invention is not limited by the disclosure of these embodiments. Instead, the invention should be determined entirely by reference to the claims that follow.

What is claimed is:

1. A method to mitigate electrical surface discharges, comprising:
    applying a first insulating primer to a metallic component;
    providing one or more electrostatically dissipative features to a carbon fiber reinforced plastic (CFRP) component adjacent the metallic component; and
    applying a second insulating primer discontinuously to the CFRP component to form at least one primed portion and at least one unprimed portion, the at least one primed portion being disposed adjacent the electrostatically dissipative features,
    wherein the insulating primer comprises a corrosion resistant finish to at least prevent galvanic corrosion of the metallic component; and
    wherein applying a second insulating primer discontinuously includes forming the at least one primed portion so that it extends at least approximately 1.75 inches from the metallic component.

2. The method of claim 1, wherein applying a second insulating primer discontinuously includes forming the at least one primed portion so that it extends no more than approximately 2.25 inches from the electrostatically dissipative feature.

3. The method of claim 1, wherein applying a second insulating primer discontinuously includes forming the a plurality of primed portion and at least one unprimed portion such that each primed portion is separate from an adjacent primed portion by at least 0.25 inches of some unprimed portion.

4. The method of claim 1, wherein applying a second insulating primer to a metallic component includes applying an insulating primer to an aluminum component.

5. The method of claim 1, wherein providing one or more electrostatically dissipative feature includes one of a primer coated metallic component, a k-code fastener, an uncoated fastener, and an unprimed portion of a CFRP component having a minimum cross section of 0.25 inches.

6. The method of claim 1, wherein applying a second insulating primer discontinuously includes forming the at least one primed portion so that it extends at least approximately 1.0 inches from the metallic component and no more than approximately 2.25 inches from the electrostatically dissipative feature.

7. A method to define a discontinuous application of an insulating primer to a carbon fiber reinforced plastic (CFRP) component which is to be secured adjacent a metallic component, comprising:
    defining a first primer portion that extends at least a minimum length from the adjacent metallic component;
    defining at least a second primer portion on the CFRP component, wherein the first primer portion and the second primer portion are separated by a first unprimed portion;
    designating a boundary for the second primer portion at the end of the CFRP component in response to a determination that the second primer portion extends beyond an end of the CFRP component;
    designating a boundary for the first unprimed portion between the first primer portion and the second primer portion in response to a determination that the unprimed portion extends between the first primer portion and the second primer portion, wherein the first primer portion and the second primer portion are positioned at least 1.75 inches from the metallic component.

8. The method of claim 7, wherein applying a second insulating primer discontinuously comprises placing a masking material on portions of the carbon fiber reinforced plastic (CFRP) component to define the first unprimed portion.

9. The method of claim 7, wherein the first unprimed portion has a width that measures between 0.105 inches and 0.145 inches.

10. The method of claim 7, wherein the boundary for the second primer portion includes an edge of the CFRP component.

11. The method of claim 7, further comprising:
    terminating at least one of the first primer portion or the second primer portion in response to a determination that the first primer portion intersects the second primer portion.

12. A method to define a discontinuous application of an insulating primer that includes dissipative features to a carbon fiber reinforced plastic (CFRP) component which is to be secured adjacent at least two metallic components, comprising:
    determining a shortest distance between a plurality of metallic components;
    reducing a minimum length of an unprimed surface portion when the shortest distanced between a plurality of components results in a unacceptable overlap between adjacent sections of insulating primer layers;
    defining a first primer portion proximate a first metallic component, wherein the first primer portion extends between 1.75 inches and 2.25 inches from an edge of the first metallic component;
    defining a boundary for the first primer portion to provide at least one dissipative feature on the CFRP component.

13. The method of claim 12, further comprising applying a second insulating primer layer discontinuously to the CFRP component.

14. The method of claim 13, wherein applying a second insulating primer layer discontinuously to the CFRP component comprises:
    determining whether a second insulating primer portion extends beyond a maximum distance from a dissipative component; and
    reducing the maximum distance when the second insulating primer portion extends beyond a maximum distance from a dissipative component.

15. The method of claim 13, wherein applying a second insulating primer layer discontinuously to a surface of a carbon fiber reinforced plastic (CFRP) component comprises:
    determining whether a second insulating primer portion extends beyond an edge of the carbon fiber reinforced plastic (CFRP) component; and reducing a length of the second insulating primer when second insulating primer portion extends beyond an edge of the carbon fiber reinforced plastic (CFRP) component.

* * * * *